US006333086B1

(12) United States Patent
Ora et al.

(10) Patent No.: US 6,333,086 B1
(45) Date of Patent: *Dec. 25, 2001

(54) MULTILAYERED POLYMER FILMS AND PROCESS FOR THE PREPARATION THEREOF

(75) Inventors: Marja Ora, Vantaa; Esa Suokas, Tampere; Mika Härkönen, Vantaa; Seppo Kuusela; Erkki Laiho, both of Porvoo, all of (FI)

(73) Assignee: Optatech Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/535,259

(22) PCT Filed: Feb. 28, 1995

(86) PCT No.: PCT/FI95/00117

§ 371 Date: Jan. 29, 1996

§ 102(e) Date: Jan. 29, 1996

(87) PCT Pub. No.: WO95/23063

PCT Pub. Date: Aug. 31, 1995

(30) Foreign Application Priority Data

Feb. 28, 1994 (FI) ........................................ 940954

(51) Int. Cl.⁷ .................................................. B29D 22/00

(52) U.S. Cl. ........................ 428/35.7; 428/34.2; 428/460; 428/480

(58) Field of Search ................................ 428/1, 35.7, 460, 428/480, 34.2

(56) References Cited

U.S. PATENT DOCUMENTS

| 4,737,398 | 4/1988 | Ikenaga ................................. 428/325 |
| 4,869,967 | 9/1989 | Inoue ..................................... 428/480 |
| 4,942,095 | 7/1990 | Buchert ................................. 428/460 |
| 5,084,352 | 1/1992 | Percec et al. .. |
| 5,124,184 | 6/1992 | Wong ..................................... 428/141 |
| 5,238,638 | 8/1993 | Isayev ..................................... 428/1 |
| 5,334,573 | 8/1994 | Schild ................................... 428/480 |
| 5,360,647 | 11/1994 | Sumida ................................... 428/1 |
| 5,364,669 * | 11/1994 | Sumida ................................... 428/1 |

FOREIGN PATENT DOCUMENTS

| 304 153 | 2/1989 | (EP) . |
| 532 766 | 3/1993 | (EP) . |

* cited by examiner

Primary Examiner—Paul R. Michl
(74) Attorney, Agent, or Firm—Cohen, Pontani, Lieberman & Pavane (57) ABSTRACT

The present invention concerns a multilayered polymer film structure, which comprises at least one first layer (1) containing a thermoplastic polymer and at least one second layer (2), arranged adjacent to said first layer, containing a liquid crystalline polymer. According to the invention, the second layer (2) consists essentially of a compounded polymer blend formed by the liquid crystalline polymer and a thermoplastic polymer, the liquid crystalline polymer of the second layer forms a continuous phase, and the first and the second layers (1, 2) contain the same thermoplastic polymer. The oxygen transmission rate of the second layer is less than about 150 cm³/(m²·d·bar), determined according to the standard ASTM D 3985-81, and the water vapour transmission rate of the integral film structure is less than 10 g/(m²·24·h) at RH 80% 23° C., determined according to ASTM F 1249-90. The present structure can be used as a barrier layer in packages.

28 Claims, 5 Drawing Sheets

MULTILAYERED POLYMER FILMS AND PROCESS FOR THE PREPARATION THEREOF

FIELD OF THE INVENTION

The present invention relates to multilayered polymer film structures for use as a barrier layer in packages. Such film structures comprise at least one first polymer layer having low permeability to moisture and, attached to the first layer, a second polymer layer having low permeability to gases, said first film comprising a isotropic polymer and said second film containing a liquid crystalline polymer.

The invention also concerns a process for preparing multilayered polymer films based on combinations of isotropic polymer layers and liquid crystalline polymer layers. Furthermore, the invention relates to laminates, comprising a substrate and at least one multilayered polymer structure coated on the surface of said substrate, wherein the polymer layer acts as a barrier to the transport of gases and moisture through the laminate.

BACKGROUND OF THE INVENTION

In food container laminates, aluminum foils have traditionally been used as sealing layers to protect the foodstuff from deterioration caused by contact with oxygen and moisture. Nowadays, the aluminum foils are to an increasing extent being replaced by various polymer films, which have good barrier properties, but which are more easily degradable in nature than aluminum. Since no single polymer can provide the same resistance to gas and water penetration as aluminum, the polymer-based laminates typically comprise multilayered polymer structures. Often, these structures incorporate thermoplastic polymers, such as polyolefins, which are heat sealable and thus make it possible to manufacture continuous structures. The polyolefins themselves are known to have excellent moisture and water vapor resistance, but they suffer from poor gas barrier properties. Therefore, the multilayered polymer structures usually include a specific gas barrier material, such as ethylene/vinyl alcohol (EVOH), a conventional polyethylene-EVOH-based multi-layer product having the following structure: PE/adhesive polymer/EVOH/adhesive polymer/PE).

It is known that thermotropic liquid crystalline polymers (LCP), have excellent barrier properties. However, the processing of them is difficult due to anisotropic behavior. Because the price of the liquid crystalline polymers is also rather high, LCP's have not been used as barrier materials in practical applications.

However, some LCP-based barrier structures are described in the prior art. Thus, EP Patent Application No. 0 503 063 discloses a composite film comprising a liquid-crystal polymer layer containing a thermotropic liquid crystal polymer and a thermoplastic polymer layer laminated on at least one surface of the liquid crystal polymer layer. The polymer layer is fixed on the liquid crystal polymer through an adhesive layer. The use of such a layer can be avoided by functionalizing the thermoplastic in order to ensure proper attachment to the LCP film.

Similar structures are also described in JP Published Patent Applications Nos. 2 220 821, 2 253 949–2 253 951, and 2 261 456.

U.S. Pat. No. 5,084,352 describes a multilayered barrier film product, which includes a first polymer having low permeability to moisture and a heterogeneous polymer blend film containing a gas barrier polymer. The heterogeneous film comprises a barrier polymer, such as EVOH, and a second polymer, distributed within the barrier polymer. The second polymer consists of a polyolefin which is functionalized, so as to allow the heterogeneous polymer film to adhere to the first polymer film having low permeability to moisture. As an example of alternative barrier polymers, U.S. Pat. No. 5,084,352 also mentions thermotropic liquid crystal polymers. These polymers are, however, not suggested for use in packaging applications, nor are there any examples given on the actual use of a LC polymer in the described multilayered film product.

The main problem associated with the known barrier structures based on liquid crystalline polymers as a barrier to oxygen penetration resides in the high price of the LC polymer and the difficult processing of the LCP layer. Since only homogeneous LC layers have so far been used, the amount of the liquid crystalline polymer in relation to the other components of the polymer structure becomes rather high, which increases the total costs of the barrier structure. Furthermore, homogeneous LCP layers are brittle and difficult to process with traditional lamination techniques.

SUMMARY OF THE INVENTION

It is, therefore, an object of the present invention to eliminate the above problems and to provide a multilayered polymer structure essentially comprising at least a first layer comprising a thermoplastic polymer and a second layer, attached to the first layer, comprising a liquid crystalline polymer blended with the polymer forming the first layer.

It is another object of the present invention to provide a process for preparing multilayered LCP-containing barrier structures. A third object of the present invention is to provide laminates containing multilayered LCP/thermoplastic-film structures.

The present invention is based on the finding that the barrier properties of anisotropic liquid crystalline polymers are not to any significant degree impaired by blending them with a thermotropic polymer provided that the liquid crystalline polymer forms a continuous layer. Therefore, it is required that the second layer contain about 60 to 99% by volume of an LCP, 40 to 1% by volume of a thermotropic (isotropic) polymer, and 0 to 10% by volume of a compatibilizer. In a layer comprising a blend of at least one anisotropic rigid-rod liquid crystalline polymer and at least one flexible isotropic polymer, the former acts as a barrier material against gas penetration because of the rigid linear molecules, the packing density of which is high in solid state. The latter provides resistance to the penetration of water vapor. The isotropic polymer preferably comprises a thermoplastic polymer which enhances attachment to an adjacent thermoplastic layer. The isotropic polymer can be functionalized in order to improve attachment.

The oxygen transmission rate of the second layer is typically less than about 150 $cm^3/(m^2 d\ bar)$, determined according to the standard ASTM D 3985-81, and the water vapour transmission rate of the integral film structure is less than 10 $g/(m^2\ 24\ h)$ at RH 80% 23° C., determined according to ASTM F 1249-90.

The prerequisite for proper formation of a continuous liquid crystalline phase is that the blend is melt processed at laminar flow conditions so as to obtain a homogeneous structure. Therefore, the process of preparing the above defined monolayer polymer materials comprises the steps of providing at least one first polymer comprising a isotropic polymer and processing the first polymer into a film, providing a polymer blend containing about 60 to 99 parts by volume of an anisotropic liquid polymer, 1 to 40 parts by volume of an isotropic thermoplastic polymer, and 0 to 10 parts by volume of a compatibilizer which improves the interaction between the anisotropic and the isotropic polymers of the blend, melt processing the polymer blend at a ratio of the viscosity of the anisotropic polymer to the viscosity of the isotropic polymer [$\lambda = \eta_{anisotropic\ polymer} / \eta_{isotropic\ polymer}$] which is in the range of about 0.5 to 5 in order to produce a polymer compound, and processing the polymer compound into a polymer film, and attaching the two films together to form a multilayered structure. Depending on the specific film forming techniques used, the formation of the polymer films and the formation of the multilayered structure may be carried out simultaneously or sequentially, preferably the coextrusion technique is employed.

The laminate suited for use, for instance, in food containers is comprised of a substrate, and at least one polymer layer coated on a surface of said substrate to act as a barrier to transport of oxygen and water vapour through the laminate. The polymer layer is comprised of a multilayered polymer structure having at least one first layer containing a thermoplastic polymer, and at least one second layer arranged adjacent to said first layer and containing a liquid crystalline polymer. The second layer consists essentially of a compounded polymer blend formed by the liquid crystalline polymer and a thermoplastic polymer. The liquid crystalline polymer of the second layer forms a continuous phase and the first and second layers contain the same thermoplastic polymer. The second layer has an oxygen transmission rate of less than 150 cm$^3$/(m$^2 \cdot$d$\cdot$bar), determined according to ASTM D 3985-81, and the integral film structure has a water vapor transmission rate of less than 10 g/(m$^2 \cdot$24$\cdot$h) at RH 80% 23° C., determined according to ASTM F 1249-90.

BRIEF DESCRIPTION OF THE DRAWINGS

The present invention is described below in greater detail with reference to the accompanying drawings, of which

DETAILED DESCRIPTION OF THE INVENTION

Definitions

Within the scope of the present invention the term "film" encompasses thin structures having at least substantially flat and smooth surfaces. Thus, in the following, the term "film" is used synonymously with "sheet".

The term "isotropic polymer" designates any thermoplastic polymer which does not decompose below its degradation point and which therefore can be melt processed in the area between the melt or glass transition and degradation temperatures.

The term "anisotropic liquid crystalline polymer (LCP)" is used for polymers which in liquid state, in particular as an ordered melt (=thermotropic LCP's), lie between the boundaries of solid crystals and isotropic liquids.

Physical mixtures of two or more (neat) polymers, if desired mixed with suitable additives and adjuvants, are called "blends", whereas the term "compounds" designates polymer blends typically also containing additives and adjuvants, which have been processed into a homogeneous mixture, which can be used for the manufacture of the polymer product, for instance a film or a sheet. Polymer blends do not form single-phase systems in material processing and application conditions and their properties depend on the dispersion of the components and are usually linked to the arithmetic average of the values of the components.

For the purpose of this description the term "compatibilizer" means a substance which promotes the compatibility of the isotropic and anisotropic components of the compounds.

"Reactive compatibilizer containing functional groups" denotes a polymer which is capable of reacting with at least one of the components of the blend. In practice it is difficult to determine the exact nature of the interaction between the compatibilizer and the other components of the blend, and to ascertain whether a chemical reaction has taken place or not. Therefore, within the scope of the present application, all polymers which contain functional groups capable of reacting with the functional groups of the matrix polymer and/or the liquid crystalline polymer, are considered to be reactive compatibilizers.

In the following description and in the examples, the composition of the present compounds of isotropic and anisotropic polymers are indicated in weight or volume percent. The volume fraction of the LCP can be calculated by using the following formula:

$$V_f = [W_f/\delta_f / W_f/\delta_f + W_m/\delta_m)] \times 100\%$$

wherein $\delta_f$=density of reinforcement
$\delta_m$=density of matrix
$W_f$=weight fraction of reinforcement
$W_m$=weight fraction of matrix

The Polymer Film Components

As mentioned above, the polymer films of the second layer are comprised of isotropic and anisotropic polymers which together provide a compounded blend, the anisotropic polymer forming the continuous phase of the blend. Although the isotropic polymer to some extent is dispersed throughout the blend, it mainly gathers on the surface of it. Optionally, the polymer films further contain compatibilizers and additives and adjuvants.

The liquid crystalline polymer of the monolayer may, for instance, comprise an aromatic main chain anisotropic polymer, preferably an anisotropic polyester, poly(ester amide), poly(ester ether), poly(ester carbonate) or poly(ester imide). It can also comprise a copolymer of a polyester, such as a copolymer of poly(ethylene terephthalate) and hydroxy benzoic acid or a copolymer of hydroxynaphthoic acid and hydroxybenzoic acid.

Generally, the liquid crystalline polymer, which is used in the present invention, can be defined as a polymer which is formed when the components of the following general formulas (or at least two of them) are reacted with each other: a dicarboxylic acid of formula I

HOOC—R$_1$—COOH            (I)

a diol of formula II

HO—R$_2$—OH            (II)

a hydroxycarboxylic acid of formula III

HO—R$_3$—COOH            (III)

wherein
  R$_1$, R$_2$, and R$_3$ each independently represents
    a bivalent aromatic hydrocarbon group,
    a group of formula R$_4$—X—R$_5$, wherein R$_4$ and R$_5$ represent a bivalent hydrocarbon group and X is an oxygen or a sulphur atom, a sulphonyl, carbonyl, alkylene, or ester group or X is a single bond,
    a xylylene group or
    a bivalent aliphatic hydrocarbon group.

The liquid crystalline polymer can also comprise a homopolymer of a hydroxycarboxylic acid of formula IV

HO—R$_3$—COOH            (IV)

Typically, the aromatic dicarboxylic acids of formula I are selected from the group comprising terephthalic acid, isophthalic acid, 4,4'diphenyl-dicarboxylic acid, diphenyl ether-4,4'-dicarboxylic acid, diphenylethane-3,3'-dicarboxylic acid, diphenylethane-4,4'-dicarboxylic acid, diphenyl ether-3,3'-dicarboxylic acid, 4,4'-triphenyl-dicarboxylic acid, 2,6-naphthalenedicarboxylic acid, diphenoxyethane-4,4'-dicarboxylic acid, diphenoxybutane-4,4'-dicarboxylic acid, diphenoxyethane-3,3'-dicarboxylic acid, and naphthalene-1,6-dicarboxylic acid.

Said aromatic dicarboxylic acids may be alkyl-, alkoxy-, or halogen-substituted. The substituted derivatives can be selected from the group comprising chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

The alicyclic dicarboxylic acids of formula I can be selected from the group comprising trans-1,4-cyclohexanedicarboxylic acid, cis-1,4-cyclohexanedicarboxylic acid, and 1,3-cyclohexanedicarboxylic acid.

The alicyclic dicarboxylic acids may also be substituted by one or more alkyl-, alkoxy-, or halogen-substituent(s). The substituted dicarboxylic acid derivatives can be selected from the group comprising trans-1,4-(1-methyl)-cyclohexane-dicarboxylic acid and trans-1,4-(1-chloro) cyclohexane-dicarboxylic acid.

The aromatic diols of formula II can be selected from the group comprising hydroquinone, resorcinol, 4,4'-dihydroxydiphenyl, 4-4'-dihydroxytriphenyl, 1,6-naphthalenediol, 2,6-naphalene-diol, 4,4'-dihydroxydiphenyl ether, 3,3'-dihydroxydiphenyl, 1,1-bis(4-hydroxyphenyl)-methane, bis(4-hydroxyphenoxy)-ethane, 2,2-bis(4-hydroxyphenyl)propane, and 3,3'-dihydroxydiphenyl ether. These diols may be substituted by one or more alkyl-, alkoxy-, or halogen substituent(s), which derivatives are exemplified by the following list: chlorohydroquinone, methylhydroquinone, 1-butylhydroquinone, phenylhydroquinone, methoxyhydroquinone, phenoxyhydroquinone, 4-chlororesorcinol, and methylresorcinol.

Typical examples of alicyclic diols of formula II include trans- and cis-1,4-cyclohexanediols, trans-1,4-cyclohexanedimethanol, trans-1,3-cyclohexanediol, cis-1,2-cyclohexanediol, and trans-1,3-cyclohexanedimethanol. Instead of these compounds the corresponding alkyl-, alkoxy-, or halogen-substituted derivatives can be used, as well.

The aliphatic diols of formula II can be straight-chained or branched and selected from the group comprising ethylene glycol, 1,3-propanediol, 1,4-butanediol, and neopentyl glycol.

The aromatic hydroxycarboxylic acids of formula III are selected from the group comprising 4-hydroxybenzoic acid, 3-hydroxybenzoic acid, 6-hydroxy-2-naphthoic acid, and 6-hydroxy-1-naphthoic acid. These compounds can be alkyl-, alkoxy-, or halogen-substituted. The substituted aromatic hydroxycarboxylic acid derivatives are preferably selected from the group comprising 3-methyl-4-hydroxybenzoic acid, 3,5-dimethyl-4-hydroxybenzoic acid, 2,6-dimethyl--4-hydroxybenzoic acid, 3-methoxy-4-hydroxy-benzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichlorohydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

In addition to the above mentioned polyesters, the LCP's used in the multilayered structures according to the invention can comprise the corresponding polyester amides. It is also possible to use polymers having a main chain containing conjugated double bonds, the monomer units of said main chain being linked to unsubstituted or substituted side chains which, together with the main chain render the polymer liquid-crystal properties. Examples of such polymers are polytiophene, polyaniline, polyacetylene, polypyrrole and polyparaphenylene substituted with alkyl chains containing at least 8 carbon atoms.

The following list exemplifies some preferred embodiments of the liquid crystalline polymers:
  copolyesters of terephthalic acid, alkylhydroquinone, p-hydroxybenzoic acid and poly(alkylene terephthalate), the alkylene substituent preferably comprising ethylene or butylene and the alkyl substituent of the hydroquinone preferably comprising a lower alkyl group such as propyl or (tertiary) butyl,
  copolyesters of p-hydroxybenzoic acid and poly(alkylene terephthalate), the alkylene group preferably being ethylene or butylene,
  copolyesters of terephthalic acid, alkylhydroquinone, p-hydroxybenzoic acid and hydroxyalkylphenylalkanoic acids, the alkyl-substituent of the hydroquinone preferably comprising a lower alkyl group such as propyl or (tertiary) butyl, the alkanoic acid preferably containing 3 to 8 carbon atoms, propanoic acid being particularly preferred, and
  blockcopolyesters of trimellithic imide-terminated poly (THF) or polysilicone, containing the imide group in para- or meta-position i.e. N-(4-carboxy-phenyl)-trimellit imide or N-(3'-acetoxy-phenyl)-trimellit imide, with acetoxybenzoic acid and at least one repeating unit selected from the group comprising diacetoxy diphenyl, hydroquinone diacetate, terephthalic acid, a trimer designated HBA—HQ—HBA (the synthesis of which is described in Europ. Polym. J. 20, 3, 225–235 (1984), and poly(ethylene terephthalate) (PET).

According to the invention, it is particularly preferred to use fully aromatic liquid crystalline polymers containing naphthalenic units. These kinds of LCP's are particularly well suited for use as barrier components in blends with thermotropic polymers.

The molecular weight of the liquid crystal polymer used in the present invention depends on the character of the repeating units of the LCP. Usually, the molecular weight is in the range of about 1,000 to 300,000. If fully aromatic polyesters are used as LCP's, their molecular weight is typically in the range of about 2,000 to 200,000, preferably about 10,000 to 50,000.

More general details on liquid crystalline polymers and their properties and applications are given in an article titled "Liquid Crystal Polymers and Their Applications" by Chung et al. in Handbook of Polymer Science and Technology, Vol. 2 (1989) 625–675.

The isotropic polymer of the multilayered structure can comprise any suitable polymer material which has the desired properties regarding resistance to penetration of water vapor as well as regarding strength and processability.

As examples of the isotropic polymers, the following may be mentioned: polyolefins such as polyethylene, polypropylene, polybutylene, polyisobutylene, poly(4-methyl-1-pentylene), including copolymers of ethylene and propylene (EPM, EPDM) and chlorinated (PVC) and chlorosulphonated polyethylenes. The isotropic polymer may also be comprised of the corresponding polyalkanes, which contain styrene (PS), acryl, vinyl and fluoroethylene groups, and different polyesters, such as poly(ethylene terephthalate), poly(butylene terephthalate) and polycarbonate, polyamides and polyethers (e.g. poly(phenylene ether). Particularly preferred polymers are the polyolefins, such as LDPE, VLDPE, MDPE, HDPE and PP and random copolymers of propylene and ethylene.

The molecular weights of the preferred isotropic thermoplastic polymers are usually in a range from about 5,000 to 50,000, preferably about 10,000 to 30,000. The flexural modulus (0.5–0.25%) of the matrix polymer is preferably about 100–10.000 MPa, in particular about 500–5000 MPa.

When compatibilizers are used in the compounds according to the invention, they typically comprise functionalized (reactive) polymers, in particular polyolefins, block- or grafted copolymers of polyolefins and polyesters, or non-polymeric surfactants. Of the functional groups of the reactive compatibilizers, the following should be mentioned: carboxy, anhydride, epoxy, oxazolino, hydroxy, amine, carbonyl, iso-cyanate, acylacetam and carbodiimide groups, the eight first being particularly preferred. The compatibilizers may also contain combinations of these groups. The polymer residues of the compatibilizer can comprise co- and terpolymers, grafted polyolefins, grafted polystyrene and thermoplastic elastomers. The polar groups of polyolefinic copolymers are generally acrylic esters or functional acrylic acid groups and maleic anhydride groups. The polar groups of the terpolymers can be maleic anhydride groups, hydroxyl groups and epoxy groups, of which the first-mentioned are particularly preferred. The styrene block copolymers can consist of polystyrene segments and flexible elastomer segments. Typical styrene block copolymers are SBS (styrene/butadiene/styrene-copolymer), SIS (styrene/isoprene/styrene-copolymer) and SEBS (styrene/ethylene butylene/styrene-copolymer).

Particularly preferred are block- or grafted copolymers comprising polyolefin groups and groups of polar polymers, the groups being incorporated into the main chain or grafted to either polymer.

Of the non-polymeric surfactant compatibilizers, the following should be mentioned: neoalkoxy titanate and neoalkoxy zirconate, alkyl silane, alkyl sulfonic acid and alkyl carboxylic acid.

Of the polymer blend additives, fillers, pigments and various substances which promote the processing of the blend can be mentioned.

Plastic additives known per se can be added to the polymer blend according to the invention. These additives comprise, for instance, stabilizers, colouring agents, lubricants, antistatic agents, fillers (e.g. talc and mica) and fire retardants. If desired, these substances can be premixed with, e.g., the isotropic polymer before forming the polymer blend. The amounts of polymer additives are typically about 0.01 to 5%, preferably about 0.1 to 2% of the weight of the polymer blend.

Of the isotropic/anisotropic compounds according to the invention, the following are particularly preferred:

Compounds containing 60 to 99 parts by volume of a fully aromatic copolyester or polyesteramide liquid crystalline polymer, and 1 to 40 parts by volume of isotropic polyolefins, such as polyethylene or polypropylene. For good attachment to adjacent layers of thermotropic polymer it is preferred to include any compatibilizer in the compounds. The addition of a compatibilizer will also improve the impact strength of the blend and dispersion of the isotropic component. Typically, an amount of about 0.1 to 5, in particular 1 to 4, parts by volume of a compatibilizer can be included.

Structure of the Multilayered Film

Figure 1:
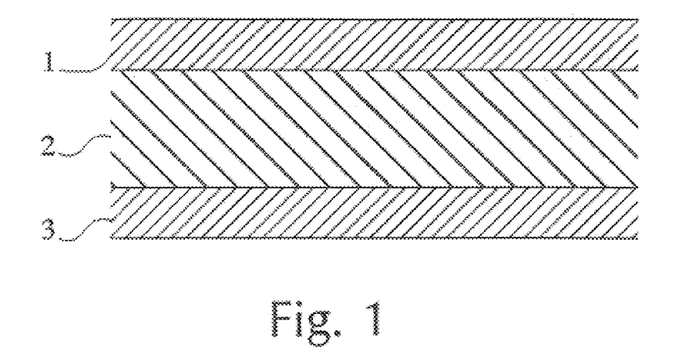
FIG. 1 depicts in a schematic section view the structure of a multilayer film according to the invention.
Figure 2:
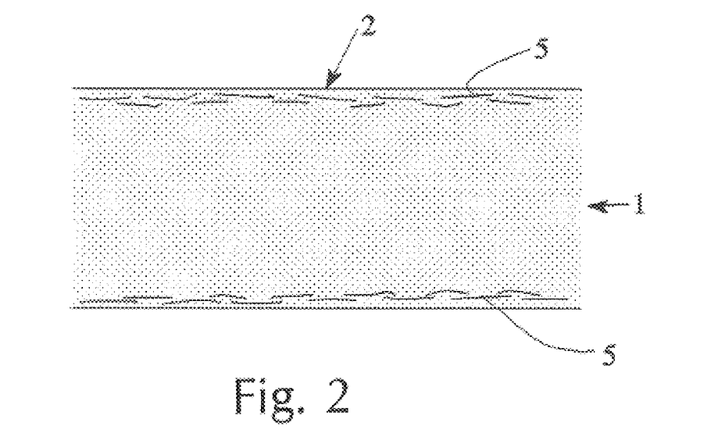
FIG. 2 shows an enlarged sectional view of the second layer of the multilayer film.

The structure of a section of the multilayered film is depicted in FIG. 1. FIG. 2 shows in more detail the structure of a section of the barrier layer of the multilayered film.

As shown in FIG. 1, a three-layered film structure comprises two layers of a isotropic polymer 1, 3 attached on each side of a barrier layer 2. The barrier layer 2 contains a homogeneous, continuous LCP phase 4 and laminar areas 5 of an isotropic polymer located primarily in the surface regions of the LCP phase.

It should be noticed that FIG. 2 represents a simplified hypothetical case, wherein the isotropic polymer is largely gathered in the clearly defined lamellar layer(s) close to the surface. In practice, the isotropic polymer is at least to some extent dispersed throughout the matrix polymer and the "layers" simply represent high concentration regions.

Figure 3:
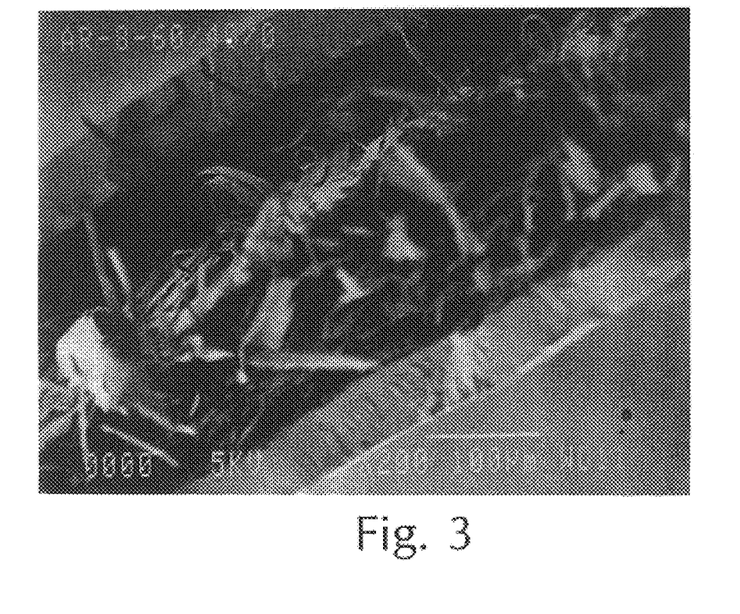
FIG. 3 depicts a SEM micrograph of a fractional surface of the multilayered film structure.

FIG. 3 depicts a typical fraction surface SEM micrograph relating to a multilayer film structure. The dispersion of the isotropic polymer in the LCP matrix is clearly seen as is the continuous LCP phase.

Figure 4A:
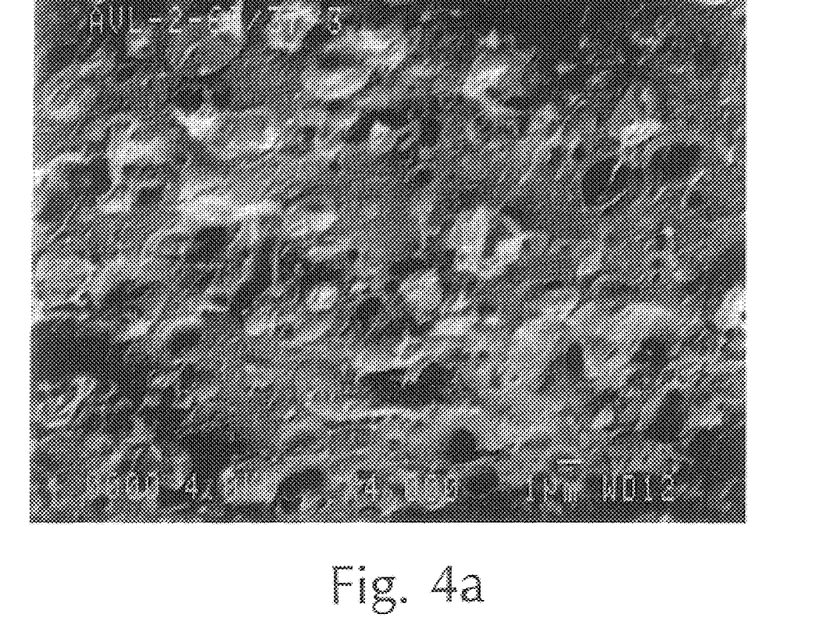
FIG. 4a shows a discontinuous LCP phase comprising elongated spheres, FIG. 4b a co-continuous phase beyond an inversion point, and FIG. 4c a discontinuous, fine dispersed LDPE phase.
Figure 4B:
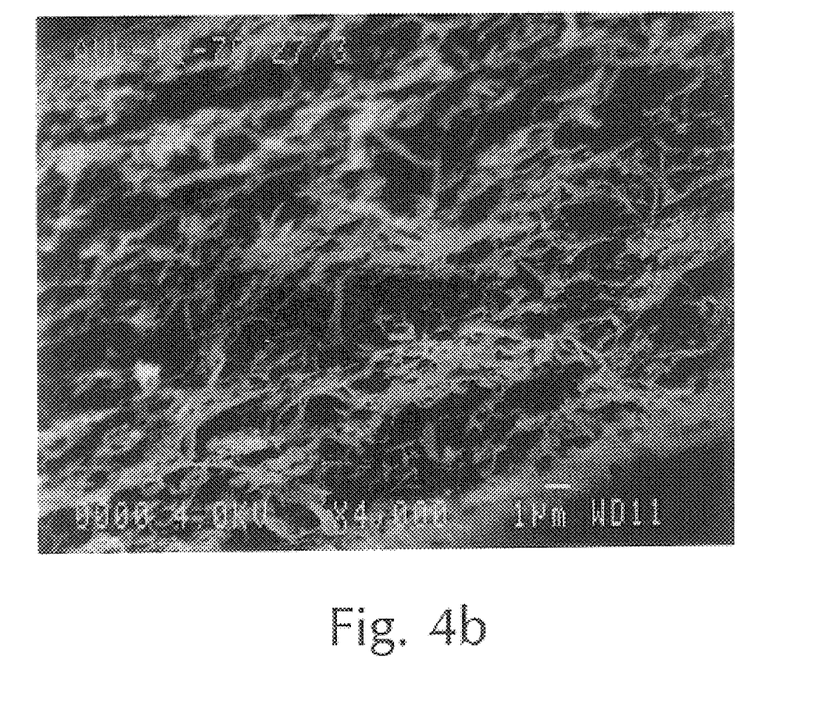
Figure 4C:
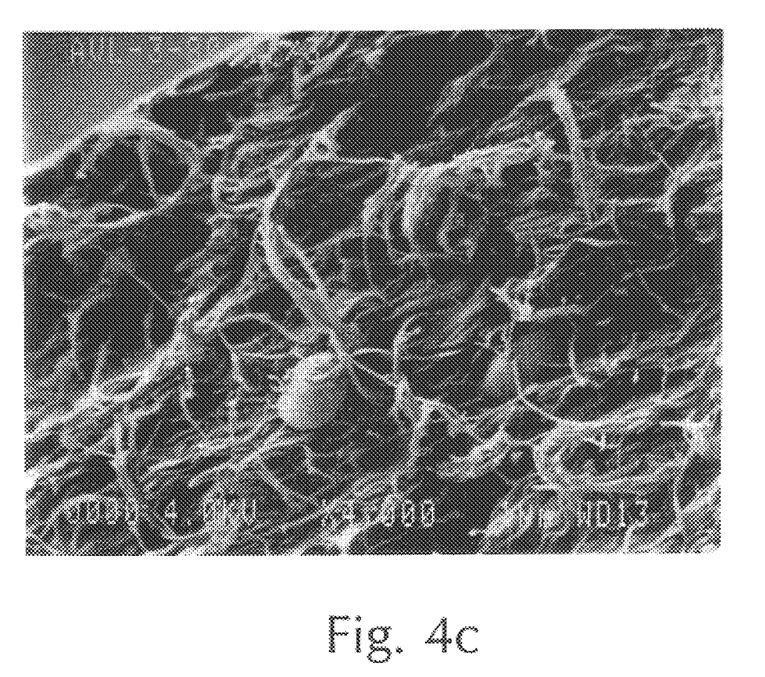
Figure 5A:
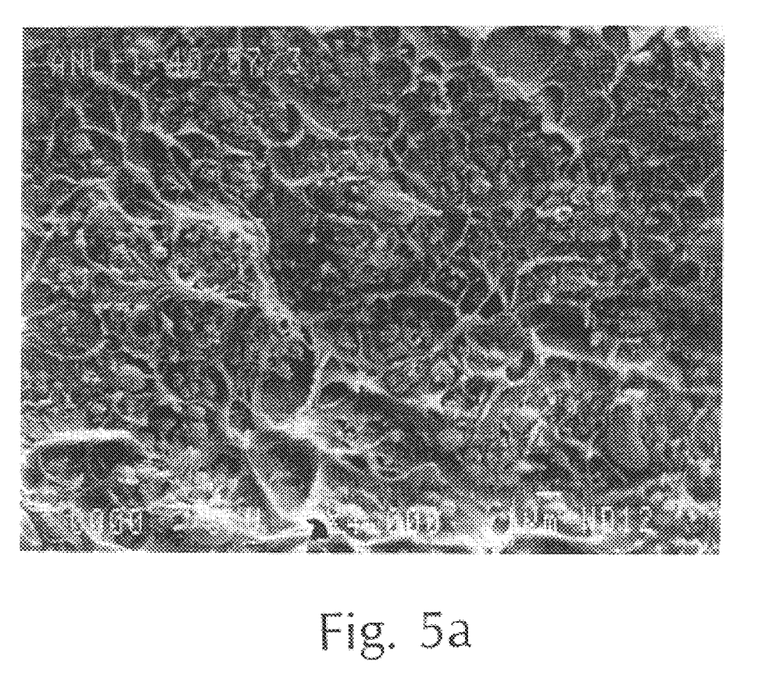
FIGS. 5a and 5b depict the effect of phase inversion on the film morphology using other LCP and PO component than in the situation of FIG. 4.
Figure 5B:
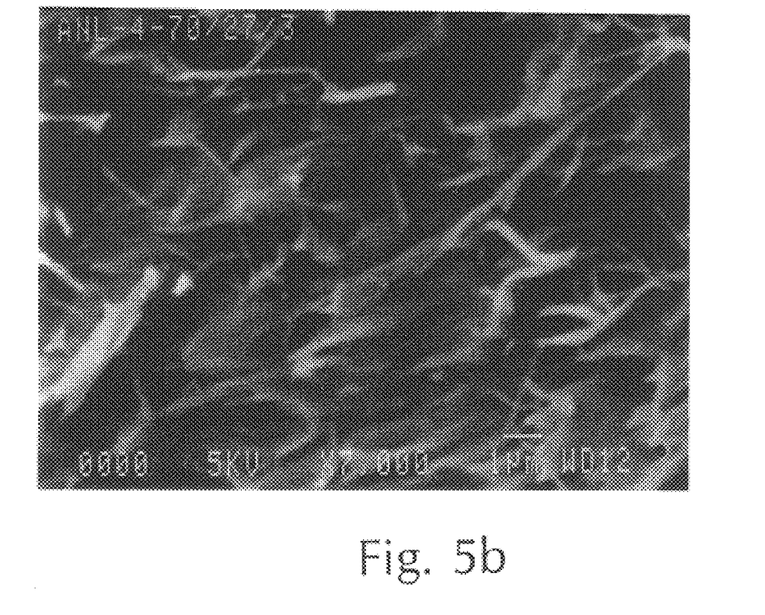
Figure 6:
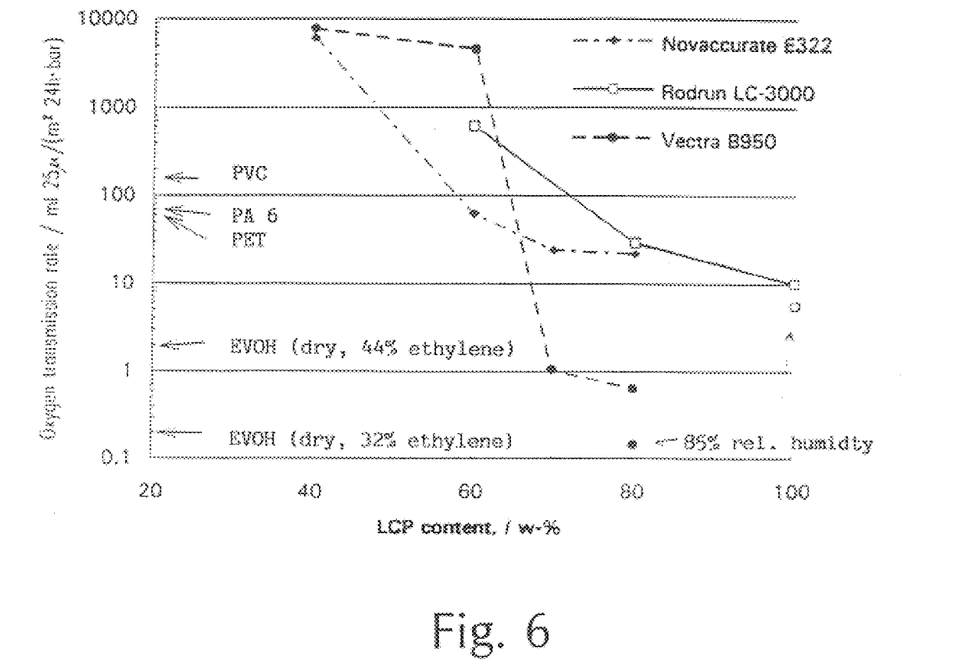
FIG. 6 shows the oxygen permeability as a function of the weight fraction of the LCP (in wt-%) for different polymer film samples.

This invention shows that the LCP content of the blend layer has to be so high that the LCP forms a continuous phase beyond an inversion point. When the LCP content is too low, as is the case in a compound composed of 60 wt-% of a LCP (Vectra B950 from Hoechst Celanese), 37 wt-% of LDPE (NCPE 1515 from Neste Oy) and 3 wt-% of a compatibilizer (Lotader 8660 from Norsolor), the LCP phase is discontinuous and comprises elongated spheres (FIG. 4a). An increase from 60 to 70 wt-% in the LCP content results in phase inversion and the isotropic and anisotropic components become sheet-like (forming a co-continuous phase), as shown in FIG. 4b. Further increase of the LCP content from 70 to 80 wt-% will break down the isotropic component (LDPE) into a fine-dispersed phase (FIG. 4c). These morphological changes directly reflect the oxygen and water permeability (FIG. 6). The same trend can be seen in FIGS. 5a and 5b when comparing two compounds, one of which is composed of LCP/Novaccurate E322 from Mitsubishi Kasei (50 wt-%), LDPE NCPE 4524 from Neste Oy (57 wt-%) and compatibilizer/Lotader 8660 from Norsolor (3 wt-%) and the other of LCP/Novaccurate E322 from Mitsubishi Kasei (70 wt-%), LDPE NCPE 7513 from Neste Oy (27 wt-%) and compatibilizer/Lotader 8660 from Norsolor (3 wt-%).

Thus, in summary, the LCP content is crucial to the oxygen and water vapor permeability of the structures according to the invention. As the examples show, with LCP weight fractions of about 80 percent by weight (corresponding to about a 70 percent volume fraction), structures were obtained having an oxygen barrier on the same level as the best known barrier polymer (such as EVAL). Experimental data show a clear improvement of the oxygen barrier of the polymer structures at LCP contents in excess of the inversion point of the blends. The lower limit of the LCP of the monolayer structures according to the invention is therefore set at about 50 vol-%.

The thickness of the barrier structure depends on the processing conditions and the relative amounts of the various components of the polymer compounds. It has been found that the brittleness problems related to homogeneous LCP films can be avoided almost entirely by manufacturing thin barrier film layers having an average thickness of less than 50 μm. A range of about 0.1 to about 10 μm is preferred. At such thicknesses (in particular the thicknesses of the preferred range), the LCP blend layer is homogeneous, smooth and glossy and it has the flexibility needed for further processing as a part of a barrier laminate.

Polymer Processing

Generally, the isotropic and anisotropic polymers are first mixed in order to form a blend which optionally contains additives and adjuvants. Then, the liquid crystalline polymers are compounded with the thermoplastics by melt processing. The applicable mixing methods include batch or continuous processes. Preferably single- or twin-screw extruders are used for compounding the liquid crystalline polymer with the thermoplastic.

The compounds according to the invention are processed according to methods known per se in polymer technology to manufacture the final products.

The basic principle governing the compounding and processing of the blend component into the final products is the morphology control of the isotropic/anisotropic blend which can be achieved by different processing techniques. As mentioned above, the best barriers of the final applications are obtained when the anisotropic LCP forms a continuous phase and the isotropic polymer is gathered at the surface areas thereof. The morphology of the LCP/isotropic polymer layer is preferably laminar. Such morphology can be generated, e.g. by co-extrusion, blow molding, film extrusion, and co-injection molding. Because the liquid crystalline polymer blends are "in situ" compounds a preferred embodiment of the invention comprises processing the blends by extrusion using sheet dies or rotating dies or stenter frame or film blowing, i.e. biaxial processing methods. For multilayer film and sheet-like structures the best processing alternatives are comprised of the co-extrusion and co-injection molding techniques.

It is known that elongational flow is more effective in inducing orientation of LCP's than shear. In fact, the orientation buildup of LCP's is independent of shear rate, the more pseudoplastic the flowing behavior, the more orientated the polymer. Also longer dies give rise to better orientation. Thus, the processing technique for preparing the structures of the invention should preferably provide biaxial orientation of the compounds based on elongational deformation in draw-down or on shear, for example during cooling. Extrusion using long dies and/or processing times is therefore advantageous.

The permeabilities of, in particular, uncompatibilized PO/LCP-blends can be controlled with the aid of the processing parameters, especially in multilayer film extrusion. Incompatibility of blend components favours domain formation of the minor component. When the amount of the LCP component is larger than that of the isotropic polymer, it has been found that in the multilayer film extrusion the viscosity ratio, λ, of the LCP and the isotropic polymer $[\lambda = \eta_{LCP}/\eta_{MATRIX\ POLYMER}]$ should be as close to 1 as possible. Preferred are viscosity ratios in the range from about 0.5 to 5, in particular in the range from about 0.8 to 1.2. This leads to laminar flow of the two components and to the formation of a continuous sheet-like LCP phase.

FIG. 6 shows the oxygen permeability of isotropic polymer/anisotropic polymer compounds as a function of the LCP content.

For the purpose of comparing compounds prepared with different LCP's, four polymer compounds were prepared containing 40, 60, 70 and 80 wt-% of a polyesteramide LCP (Vectra B950, supplied by Hoechst-Celanese), the isotropic polymer of the compounds being a LDPE (NCPE 1515, supplied by Neste Oy). Another series of LCP/LDPE compounds having the same LCP-contents were prepared using a polyester LCP (Novaccurate E322 supplied by Misubishi Kasei), and finally a third series of LCP/LDPE compounds containing 60, 80 and 100 wt-% LCP was prepared using a polyester LCP (Rodrun supplied by Unitika).

The oxygen permeabilities of a number of known barrier materials are shown in FIG. 6.

It is evident from the figure that when the LCP content of a LCP/PE compound increases over 50%, a phase inversion takes place. After the inversion point, the LCP forms the continuous phase and the oxygen permeability radically decreases in the films according to the invention. The permeability of these LCP/PE compound films with 60 to 70 vol-% LCP is very close to the best known barrier polymer (EVOH). The best blends have barrier properties which are on the same level as low ethylene content EVOH even in dry conditions. Moisture has no effect on the barrier properties of LCP blends and the water barrier properties are also good. It will also be apparent from the figure that the barrier properties of LCP blends are not significantly lower than those of homogeneous LCP polymers.

Many isotropic polymers, in particular the polyolefins, have good resistance to penetration of water vapor. The structures according to the invention will provide good to excellent resistance to oxygen penetration while still maintaining most of the low water vapor permeability properties of the polyolefins.

Laminate Applications

The film structures according to the invention can be used for the preparation of laminates. In addition to the film structures, the laminates according to a preferred embodiment of the invention comprise at least one layer consisting of a lignocellulosic material made up of, for instance, cellulose fibers. However, it is also possible to prepare laminates comprising films of other polymeric materials.

The cellulose fiber layers in the laminate can be comprised of paper webs, paperboard webs or similar cellulose based products. The cellulose contained in the layers can stem from chemical or mechanical pulp which further can be bleached or unbleached pulp.

The surface area weight of the material used for the cellulose fiber layer is typically approx. 10 to 500 g/m$^2$. Typically, paperboard with a surface area weight of approx. 100 to 250 g/m$^2$ is employed.

In addition to the barrier layer and the outer layer attached to it, the cellulose fiber-based laminates can contain other polymer layers as well. Said layers can be formed from thermoplastic polymers such as polyolefins, polyesters or similar polymers. Different types of copolymers are also suitable for use in the polymer material layers. As an example of a suitable copolymer, an ethylvinyl acetate copolymer can be mentioned. The polymer or the cellulose fiber material can be replaced by regenerated cellulose polymer materials such as cellophane. The surface area weights of the polymer layers in the laminate are in the range of approx. 1 to 250 g/m$^2$, preferably approx. 5 to 100 g/m$^2$.

The laminates according to the invention can be produced by laminating a film of the multillayered structure on a cellulosic fiber or polymeric layer by methods known per se. Thus, the method can be implemented by using extrusion coating, the polymer structure being produced by extrusion into a multilayered sheet which is adhered to the surface of a cellulose fibre web. A second polymeric layer, which is applied on either side of the polymer/cellulosic layer combination, can be adhered at another stage. The method can also be implemented by using extrusion laminating which operates by feeding said polymer sheet from the extruder between at least two webs and then adhering it to these. One or both of the webs can be formed by a cellulose fibre web and/or a second polymer material. This method is implemented particularly advantageously using the coextrusion technique in which all polymer layers of the laminate are produced in a single stage in a coextruder.

The laminates according to the invention can be produced into packaging materials, bags, wrappers, moisture-proof papers and similar products exhibiting oxygen and moisture vapor barrier capability. Paperboard grades for liquid product packages, e.g., milk and juice cartons, are preferred applications for the laminates described above.

Industrial Applicability

As mentioned above, the structures according to the invention can be used in barrier vessels (e.g. gasoline tanks), barrier containers (e.g. containers for foodstuffs, household chemicals and other chemicals; food jars, microwave cups), and barrier films (e.g. barrier layer in liquid packages and bottles). One particularly suitable substrate for the multilayered structures comprises paperboard.

In the following, the invention will be illustrated with the help of working examples describing the preparation of multilayered film structures.

The oxygen gas and water vapor permeabilities of the LCP-LDPE films were tested according to the following standards:
    oxygen gas transmission rate: ASTM D 3985-81 (Reapproved 1988)
    water vapor transmission rate: ASTM F 1249-90

The Standard Test Method ASTM D 3985-81 employes a coulometric sensor for determining oxygen gas transmission rate ($O_2$GTR) through plastic film and sheeting. The sample to be tested is first equilibrated in a dry-test environment, the relative humidity of which is less than 1%. Then the specimen is mounted as a sealed semi-barrier between two chambers at ambient atmospheric pressure. One chamber is slowly purged by a stream of nitrogen and the other chamber contains oxygen. As oxygen gas permeates through the film into the nitrogen carrier gas, it is transported to the coulometric detector where it produces an electrical current, the magnitude of which is proportional to the amount of oxygen flowing into the detector per unit time.

The barrier results are based on at least two specimens. The gas and water vapor transport coefficients for the films having varying thickness were calculated for a theoretical value of 25 $\mu$m.

EXAMPLE 1

A three-layered structure was prepared comprising an intermediate polymer film layer containing a LCP/thermoplastic polymer blend and two outer layers consisting of a thermoplastic polymer film, one outer layer being attached to each side of the intermediate film.

As thermoplastic material, a LD polyethylene of grade NCPE 1515 was chosen. This polyethylene is supplied by Neste Oy, Finland. The liquid crystalline polymer (LCP) used was a poly(ester amide) marketed under the name Vectra B950 (Hoechst Celanese). A random terpolymer of ethylene, butylene acrylate and glycidyl methacrylate (E/BA/GMA) supplied by Norsolor under the trade name Lotader AX 8660 was used as a compatibilizer (COMP) in the LCP-based blend.

The polymer compound for the intermediate layer was produced with a twin-screw extruder at a temperature of 290° C. The compound was pelletized. A three-layer film was then prepared by coextrusion using a conventional plane film apparatus.

The recipe of the LCP-PO compound blend was

| | |
|---|---|
| LCP | 80.0 wt-% |
| LDPE | 17.0 wt-% |
| Compatibilizer | 3.0 wt-% |

The permeability of the film to oxygen and water vapor was assessed by the above-mentioned standard methods, based on a theoretical film thickness of 25 $\mu$m. The oxygen permeability of the film calculated for the PO/LCP blend layer was 0.63 ml/(m$^2$ 24 h bar) at 23° C. at dry conditions, and the water vapor permeability was 1.4 g/(m$^2$ 24 h) at 23° C. and at a relative humidity (RH) of 80%. At damp conditions (RH=86%, T=23° C.), the oxygen permeability was 0.12 ml/(m$^2$ 24 h bar).

EXAMPLES 2 to 4

Further three-layered structures were prepared from LDPE and different liquid polymer blends. The composition of the intermediate layer and the permeabilities of the film structures are indicated in Table 1. The liquid crystalline polymer used in these examples comprised a copolyester of p-hydroxybenzoic acid (HBA) and polyethyleneterephthalate (PET) marketed under the name Rodrun LC-3000 (Unitika Ltd.). This specific LCP has a PHB/PET molar ratio of 60/40, the relative viscosity $\eta_{rel}$ is 1.42 (tetrachloroethane/phenol=1/1, 35° C.), and the glass transition point is 64° C.

TABLE 1

Compositions and properties of three-layered film structures

| Example # | Blend composition | Oxygen permeability ml/(m² 24 h bar) | Water vapor permeability g/(m² 24 h) | Interfacial adhesion |
|---|---|---|---|---|
| 2 | 80 wt-% LCP 17 wt-% LDPE 3 wt-% COMP | 29 | 4.0 | rather poor |
| 3 | 60 wt-% LCP 40 wt-% LDPE | 100 | 4.9 | fair |
| 4 | 60 wt-% LCP 37 wt-% LDPE 4 wt-% COMP | 610 | 3.24 | good |

The oxygen permeability was measured at 23° C. and dry conditions.

The water vapor permeability was measured at 23° C. and RH 85%

EXAMPLE 5

Two three-layered film structures were prepared as described in Example 1. In one of the films, the LCP-based polymer blend was composed of 70 wt-% LCP (Vectra B950), 27 wt-% PE (NCPE 1515) and 3 wt-% compatibilizer (Lotader 8660), whereas the other blend was composed of 40 wt-% LCP (Vectra B950) 57 wt-% PE (NCPE 1515) and 3 wt-% compatibilizer (Lotader 8660). In the latter case, with the polyesteramide LCP used, the LCP content was not high enough for formation of a continuous phase, which is apparent from the results given in Table 2, and which can be seen in FIGS. 4a and 4b.

TABLE 2

Composition and oxygen permeability of three-layered film structures

| Sample | Blend composition | Oxygen permeability ml/(m² 24 h bar) |
|---|---|---|
| A | 70 wt-% LCP 27 wt-% LDPE 3 wt-% COMP | 1.0 |
| B | 60 wt-% LCP 37 wt-% LDPE 3 wt-% COMP | 4600 |

EXAMPLE 6

Two LDPE/LCP blends were compounded by twin-screw extrusion. One of the compounds was composed of the commercial thermotropic polyesteramide Vectra B950 and the other of the commercial thermotropic polyester Vectra A950. The recipes of blends for the middle barrier layer were the following:

| Recipe 1: | Vectra B950 | 80 wt-% |
| | NCPE 1515 | 17 wt-% |
| | Lotader 8660 | 3 wt-% |

-continued

| Recipe 2: | Vectra A950 | 80 wt-% |
| | NCPE 1515 | 17 wt-% |
| | Lotader 8660 | 3 wt-% |

These compounds were coextruded into the 3-layer films having LCP/NCPE 1515 skin layers. The melt temperature was 300° C. in the case of recipe 1, whereas the second recipe was extruded at temperatures of 300° C. and 280° C.

Only the polyesteramide LCP-based compound was successfully extruded into a 3-layer film structure. The thickness of the whole film was 135 μm and that of the blend barrier layer 70 μm. The measured oxygen gas transmission rate and water vapor transmission rate was 0.32 cm³ (m²·d·bar) and 0.32 g/(m²·d), respectively, for the barrier layer.

Figure 7A:
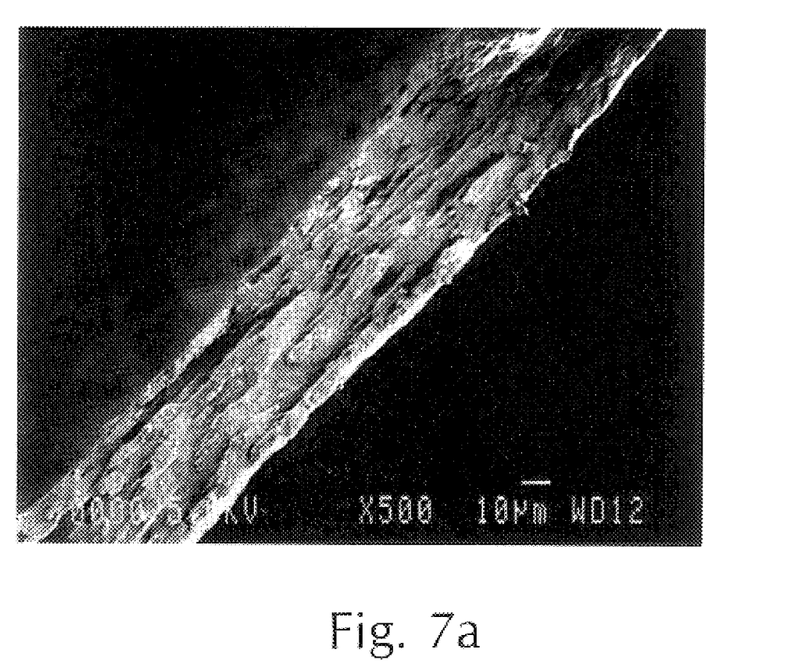
FIGS. 7a and 7b depict the fracture surface of the barrier layer of a film structure based on a different LCP than the one shown in FIGS. 4 and 5.
Figure 7B:
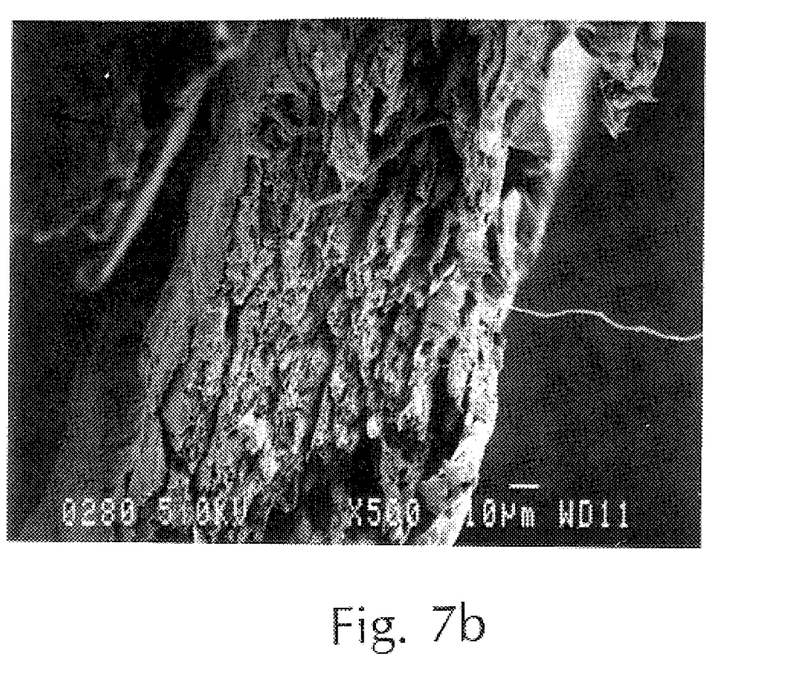

Multi-layer extrusion of the polyester LCP-based compound (recipe 2) was not successful. By using conventional flat film dies the melt flow of this blend was very unstable and turbulent, not laminar, resulting in an unhomogeneous film with holes and thickness variation both in length and width direction. The main reason for the difference between the polyesteramide and the polyester LCP-based blends are dissimilar melt elasticity due to hydrogen bonding. The fracture surface of the monolayer film processed from the recipe 2 indicates that the mophology of LDPE/LCP barrier layer resembles that shown in FIG. 4 (FIGS. 7a and 7b). FIG. 7a depicts the fracture surface of the recipe 2 melt-processed at 280° C. and there are no distinct differences between lamellar layers through the thickness direction, i.e. the lamellae are fused together. When the processing temperature was raised to 300° C., the fracture surface was transformed into heterogeneous and distinct layers can be discerned (FIG. 7b). The polyesteramide LCP-based compound (Vectra B950) resulted in more fine fibrillar barrier layer than the polyester LCP-based one (Vectra A950).

In addition, the morphological changes reflects to melt extrusion during the phase inversion stage. The minor isotropic phase has to be transformed into a fine-dispersed phase through a co-continuous phase stage, which is a prerequisite for successful multi-layer extrusion.

What is claimed is:

1. A multilayered polymer film structure for use as a barrier layer in packages, consisting essentially of:
at least one first layer containing a polyolefin;
at least one second layer arranged adjacent to said first layer and containing a liquid crystalline polymer, the second layer consisting essentially of a compounded and compatibilized polymer blend formed by the liquid crystalline polymer, a polyolefin and a compatibilizer, the liquid crystalline polymer of the second layer forming a continuous phase, the second layer having an oxygen transmission rate of less than 150 cm³/ (m²·d·bar), determined according to ASTM D 3985-81, and the integral film structure having a water vapour transmission rate of less than 10 g/(m²·24·h) at RH 80% 23° C., determined according to ASTM F 1249-90, the second layer containing 60 to 99 parts by volume of the liquid crystalline polymer, 1 to 40 parts by volume of the polyolefin, and 0.1 to 5 parts by volume of the compatibilizer enhancing an interaction between the liquid crystalline polymer and the polyolefin, contents of the polymers and the compatibilizer being based upon total volume of the second layer; and
a tie layer of maleic anhydride modified polyolefin that adheres the second layer to the first layer.

2. A polymer film structure according to claim 1, wherein the second layer has a thickness of less than 50 μm.

3. A polymer film structure according to claim 1, wherein the liquid crystalline polymer is comprised of one of an at least partially aromatic polyester and a copolymer of an aromatic polyester.

4. A polymer film structure according to claim 3, wherein the liquid crystalline polymer is one of the group consisting of a polyester amide, a polyester imide, polyester ether and polyester carbonate.

5. A polymer film structure according to claim 4, wherein the liquid crystalline polymer is polyesteramide.

6. A polymer film structure according to claim 3, wherein the liquid crystalline polymer is comprised of one of the group consisting of an aromatic polyester and a polyester amide, at least one monomer of which is comprised of a naphthalenic compound.

7. A polymer film structure according to claim 6, wherein the second layer contains 60 to 90% by volume of the liquid crystalline polymer, 40 to 10% by volume of the polyolefin and up to 10% by volume of the compatibilizer.

8. A polymer film structure according to claim 1, wherein the polyolefin comprises a polymer selected from the group consisting of LDPE, VLDPE, MDPE, HDPE and PP and random copolymers of propylene and ethylene.

9. A polymer film structure according to claim 1, wherein the compatibilizer comprises one of the group consisting of a functionalized polyolefin, one of a block copolymer and a grafted copolymer of polyolefin and a polyester, and a non-polymeric surfactant.

10. A polymer film structure according to claim 9, wherein the functionalized polyolefin comprises a olefinic polymer functionalized with one of epoxy, carboxylic acid, anhydride, hydroxyl, amine, carbonyl and oxazoline groups and combinations thereof.

11. A polymer film structure according to claim 9, wherein the block copolymer comprises polyolefin groups and groups of polar polymers, the groups being incorporated into a main chain.

12. A polymer film structure according to claim 9, wherein the grafted copolymer comprises polyolefin groups and groups of polar polymers, the groups being grafted to either polymer.

13. A polymer film structure according to claim 9, wherein the non-polymeric surfactant comprises alkyl silane, one of neoalkoxy titanate and neoalkoxy zirconate, and one of alkyl sulfonic acid and alkyl carboxylic acid.

14. A polymer film structure according to claim 1, wherein the tie layer is maleic anhydride grafted copolyethylene.

15. A polymer film structure according to claim 1, wherein at least two first polymer layers are provided, one on each side of the second layer.

16. A polymer film structure according to claim 1, wherein the first and second layers have an extruded structure.

17. A polymer film structure according to claim 16, wherein the extruded structure is formed by coextrusion.

18. A polymer film structure according to claim 16, wherein the extruded structure is any one of a blow-molded bottle, container and can.

19. A process for preparing a multilayered polymer film, comprising the steps of:
provides a first polymer consisting of a polyolefin;
melt processing said first polymer to produce at least one first polymer layer;
providing a polymer blend comprising about 1 to about 40 parts by volume of a polyolefin, about 99 to 60 parts by volume of an anisotropic liquid crystalline polymer, and 0.1 to 5 parts by volume of a compatibilizer;
melt processing said polymer blend at a viscosity ratio between the anisotropic polymer and the polyolefin $[\lambda = \eta_{anisotropic\ polymer}/\eta_{isotropic\ polymer}]$ in a range of about 0.5 to 5 to produce a polymer compound essentially consisting of a laminar layer composed of a continuous liquid crystalline polymer base; and
processing said polymer compound into a second polymer layer, the second layer having an oxygen transmission rate of less than about 150 $cm^3/(m^2 \cdot d \cdot bar)$, determined according to ASTM D 3985-81, and the multilayered polymer film having a water vapor transmission rate of less than 10 $g/(m^2 \cdot d \cdot bar)$ at RH 80% 23° C., determined according to ASTM F 1249-90.

20. A process according to claim 19, wherein said polymer blend processing step includes processing the polymer blend at a viscosity ratio of about 0.8 to about 1.2, said ratio resulting in stable laminar flow of the polymer blend.

21. A process according to claim 19, wherein the melt processing and film processing include extruding.

22. A laminate, comprising:
a substrate; and
at least one polymer layer coated on a surface of said substrate to act as a barrier to transport of oxygen and water vapour through the laminate, the polymer layer being comprised of a multilayered polymer structure consisting essentially of at least one first layer consisting of a polyolefin, at least one second layer arranged adjacent to said first layer and containing a liquid crystalline polymer, and a tie layer that adheres the second layer to the first layer, the second layer consisting essentially of a compounded and compatibilized polymer blend formed by the liquid crystalline polymer, a polyolefin and a compatibilizer, the liquid crystalline polymer of the second layer forming a continuous phase, the second layer having an oxygen transmission rate of less than 150 $cm^3/(m^2 \cdot d \cdot bar)$, determined according to ASTM D 3985-81, and the laminate having a water vapor transmission rate of less than 10 $g/(m^2 \cdot 24 \cdot h)$ at RH 80% 23° C., determined according to ASTM F 1249-90, the second layer containing 60 to 99% of the liquid crystalline polymer, 1 to 40% of the polyolefin, and 0.1 to 5% of the compatibilizer enhancing an interaction between the liquid crystalline polymer and the polyolefin, contents of the polymers and the compatibilizer being based upon total volume of the second layer.

23. A laminate according to claim 22, wherein the substrate is one of paper board and paper.

24. A laminate according to claim 22, wherein the substrate is formed as one of a cloth and a web.

25. A laminate according to claim 22, wherein, the polymer layer has one side on which a cellulosic fiber layer is arranged and an opposite side on which a polyolefin layer is arranged.

26. A method for manufacturing a container for food stuff or chemicals, which comprises the step of forming a container from a laminate comprising:
a substrate; and
at least one polymer layer coated on a surface of said substrate to act as a barrier to transport of oxygen and water vapour through the laminate, the polymer layer consisting essentially of a multilayered polymer structure having at least one first layer consisting of a polyolefin, at least one second layer arranged adjacent to said first layer and containing a liquid crystalline polymer, and a tie layer that adheres the second layer to the first layer, the second layer consisting essentially of a compounded and compatibilized polymer blend formed by the liquid crystalline polymer, a polyolefin and a compatibilizer, the liquid crystalline polymer of the second layer forming a continuous phase, the second layer having an oxygen transmission rate of less than 150 cm$^3$/(m$^2$·d·bar), determined according to ASTM D 3985-81, and the laminate having a water vapor transmission rate of less than 10 g/(m$^2$·24·h) at RH 80% 23° C., determined according to ASTM F 1249-90, the second layer containing 60 to 99% of the liquid crystalline polymer, 1 to 40% of the polyolefin, and 0.1 to 5% of the compatibilizer enhancing an interaction between the liquid crystalline polymer and the polyolefin, contents of the polymers and the compatibilizer being based upon total volume of the second layer.

27. A multilayered polymer film structure for use as a barrier layer in packages, consisting essentially of:

at least one first layer containing a polyolefin;

at least one second layer arranged adjacent to said first layer and containing a liquid crystalline polymer, the second layer consisting essentially of a compounded and compatibilized polymer blend formed by the liquid crystalline polymer, a polyolefin and a compatibilizer, the liquid crystalline polymer of the second layer forming a continuous phase, the second layer having an oxygen transmission rate of less than 150 cm$^3$/(m$^2$·d·bar), determined according to ASTM D 3985-81, and the integral film structure having a water vapour transmission rate of less than 10 g/(m$^2$·24·h) at RH 80% 23° C., determined according to ASTM F 1249-90, the second layer containing 60 to 99 parts by volume of the liquid crystalline polymer, 1 to 40 parts by volume of the polyolefin, and up to 0.1 to 5 parts by volume of the compatibilizer enhancing an interaction between the liquid crystalline polymer and the polyolefin, contents of the polymers and the compatibilizer being based upon total volume of the second layer; and a tie layer that adheres the second layer to the first layer, the compatibilizer being a functionalized polyolefin comprising an oleofinic polymer functionalized with one of the group consisting of epoxy, carboxylic acid, anhydride, hydroxyl, amine, carbonyl and oxazoline groups and combinations of these groups.

28. A multilayered polymer film structure for use as a barrier layer in packages, consisting essentially of:

at least one first layer containing a polyolefin;

at least one second layer arranged adjacent to said first layer and containing a liquid crystalline polymer, the second layer consisting essentially of a compounded and compatibilized polymer blend formed by the liquid crystalline polymer, a polyolefin and a compatibilizer, the liquid crystalline polymer of the second layer forming a continuous phase, the second layer having an oxygen transmission rate of less than 150 cm$^3$/(m$^2$·d·bar), determined according to ASTM D 3985-81, and the integral film structure having a water vapour transmission rate of less than 10 g/(m$^2$·24·h) at RH 80% 23° C., determined according to ASTM F 1249-90, the second layer containing 60 to 99 parts by volume of the liquid crystalline polymer, 1 to 40 parts by volume of the polyolefin, and 0.1 to 5 parts by volume of the compatibilizer enhancing an interaction between the liquid crystalline polymer and the polyolefin, contents of the polymers and the compatibilizer being based upon total volume of the second layer; and a tie layer that adheres the second layer to the first layer, at least two of the first layers being provided, one on each side of the second layer, the tie layer being of maleic anhydride grafted copolyethylene on each side of the second layer for adhering each of the first layers to a respective side of the second layer.

* * * * *